United States Patent
Love et al.

[11] Patent Number: 6,107,617
[45] Date of Patent: Aug. 22, 2000

[54] LIQUID CRYSTAL ACTIVE OPTICS CORRECTION FOR LARGE SPACE BASED OPTICAL SYSTEMS

[75] Inventors: Gordon D. Love, Durham, United Kingdom; Richard A. Carreras; Sergio Restaino, both of Albuquerque, N. Mex.; Janet S. Fender, Placitas, N. Mex.; Dennis Duneman, Albuquerque, N. Mex.

[73] Assignee: The United States of America as represented by the Secretary of the Air Force, Washington, D.C.

[21] Appl. No.: 09/092,608

[22] Filed: Jun. 5, 1998

[51] Int. Cl.⁷ .................................................... G01J 1/20
[52] U.S. Cl. .................................. 250/201.9; 356/121
[58] Field of Search .......................... 250/201.9, 216; 356/121; 359/292, 295

[56] References Cited

U.S. PATENT DOCUMENTS

| | | | |
|---|---|---|---|
| 3,962,576 | 6/1976 | Kuhl et al. | 250/201.9 |
| 4,309,602 | 1/1982 | Gonsalves | 250/201 |
| 5,350,911 | 9/1994 | Rafanelli et al. | 250/201.9 |
| 5,396,364 | 3/1995 | O'Meara et al. | 359/292 |
| 5,610,707 | 3/1997 | Duncan et al. | 356/121 |
| 5,994,687 | 11/1999 | Chanteloup et al. | 250/201.9 |

OTHER PUBLICATIONS

R. A. Gonslaves, "Wavefront sensing by phase retrieval," SPIE vol. 207, Applications of Digital Image Processing III (1979), pp. 32–39.

R. A. Gonslaves, "Phase retrieval and diversity in adaptive optics," Opt. Eng. vol. 21, No. 5, pp. 829–832 (1982).

G. D. Love, et al, "Adaptive wavefront shaping with liquid crystals," Optics & Photonics News, Oct. 95, pp. 16–20.

R. A. Carreras, et al, "Phase diversity experimental results: deconvolution of ν Scropii,", Optics Comm. 130 (1996) 13–19.

Primary Examiner—Stephone B. Allen
Attorney, Agent, or Firm—Kenneth E. Callahan

[57] ABSTRACT

Large space-based optical systems are expected to produce optical beams with large wavefront phase aberrations due to their size, weight limitations, optical misaligments and primary mirror imperfections. The present invention combines a phase diversity wavefront sensor with a real-time programmable two-dimensional array of liquid crystal variable retarders for wavefront correction.

3 Claims, 3 Drawing Sheets

LIQUID CRYSTAL ACTIVE OPTICS CORRECTION FOR LARGE SPACE BASED OPTICAL SYSTEMS

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

FIELD OF THE INVENTION

The present invention relates generally to an adaptive optics imaging system and in particular to a phase aberration compensation system for large space-based optical systems using nematic liquid crystal spatial light modulators and phase diversity wavefront detection.

DESCRIPTION OF THE PRIOR ART

Adaptive optics have been used for a number of years to improve the image quality of large earth-based telescopes by compensating for phase aberrations induced by the atmosphere. Small temperature variations in the atmosphere induce fluctuations in the air's refractive index causing an initial plane wavefront to traverse different optical path lengths en route to the telescope focus. Over time the image is blurred. A wavefront sensor is used to measure phase aberrations caused by the atmosphere which then sends correcting signals to a mechanically activated deformable mirror. The control system needs to operate in frequency ranges of tens to thousands of Hertz to counter the small but rapid fluctuations of the atmosphere.

Very large optical telescopes with apertures of over several meters raise a number of design problems primarily due to weight limitations and structural integrity. Inflatable aperture and segmented aperture designs are being considered for the large primary mirror. The larger the primary aperture, the more difficult it becomes to hold mounts, structures, and surfaces to the needed optical tolerances. These space systems, when deployed, are expected to be out of optical alignment to a much larger extent than earth-based telescopes. Wavefront aberrations for space-based systems would be caused primarily by thermal effects and attitude control maintenance.

In contrast to earth-based atmospheric fluctuation induced aberrations, those for large space-based telescopes are expected to have wavefront phase aberrations of much greater amplitude but with considerably lower frequency. Mechanically activated deformable mirrors can handle the high frequency of atmospheric fluctuations but do not have the dynamic range necessary for the larger space-based aberrations.

An accurate determination of the wavefront errors is necessary before they can be removed by adaptive optics techniques. Earth-based adaptive optic telescopes generally used wavefront sensors based on measurements of point sources, such as a star or a laser beacon. Space-based telescopes used for earth observations, however, require a wavefront sensor based on the object scene.

Phase diversity is a known technique whereby the optical-system aberrations are derived directly from the object scene. Two images from the same optical beam with one containing a known induced aberration are compared to determine the wavefront errors. Phase diversity algorithms can be independent of the object scene content. The phase diversity concept is described in the following papers: R. A. Gonsalves, "Wavefront sensing by phase retrieval," SPIE Vol. 207, Applications of Digital Image Processing III (1979); R. A. Gonsalves, "Phase retrieval and diversity in adaptive optics," Opt. Eng. 21 829–832 (1982); and in U.S. Pat. No. 4,309,602.

An example of a phase diversity wavefront sensor is revealed in U.S. Pat. No. 5,610,707. A beamsplitter is used to split an optical input beam into identical half beam portions. A phase plate of known phase offset is interposed between one of the beams to generate an unfocused image of an object scene. The unfocused and best focused images are combined using phase diversity techniques to estimate wavefront aberrations present in the imaging system.

Large space-based optical systems would have large wavefront phase errors that are beyond the correction capabilities of deformable mirrors. These phase errors, however, change slowly over time compared to atmospheric fluctuations. Both of these characteristics are compatible with wavefront correction by liquid crystal spatial light modulators (LC SLM).

Nematic liquid crystal spatial light modulators with a pixelated liquid crystal structure have been demonstrated. (G. D. Love, et al, "Adaptive Wavefront Shaping with Liquid Crystals," Optics & Photonics News, Oct. 95 and G. D. Love, "Wavefront Correction and Production of Zernike Modes with a Liquid Crystal SLM.) The individual pixels can be accurately controlled to provide wavefront shaping and correction.

SUMMARY OF THE INVENTION

The present invention combines the object scene-based phase diversity technique with a liquid crystal spatial light modulator to correct phase errors induced in large space-based telescopes due to optical misalignments when deployed and primary mirror imperfections. Phase diversity permits the determination of wavefront phase errors without the necessity of a point source reference, thereby facilitating, for example, earth observations from space and simplifying the optical system. The large but relatively slowly changing aberrations of large space-based optical systems as determined by a phase diversity sensor are then corrected by a multi-element liquid crystal spatial light modulator.

DESCRIPTION OF THE PREFERRED EMBODIMENT

The present invention provides an active closed-loop control system that detects and corrects optical aberrations present in a large space-based imaging system. The preferred technique for detecting optical phase aberrations of a large space-based optical system is the technique of phase diversity. The phase diversity technique works well for extended objects and is relatively simple to implement. The estimated phase aberrations determined from the wavefront sensor are then corrected by a two-dimensional array of liquid crystal variable retarders acting as a real-time programmable phase mask.

Figure 1:
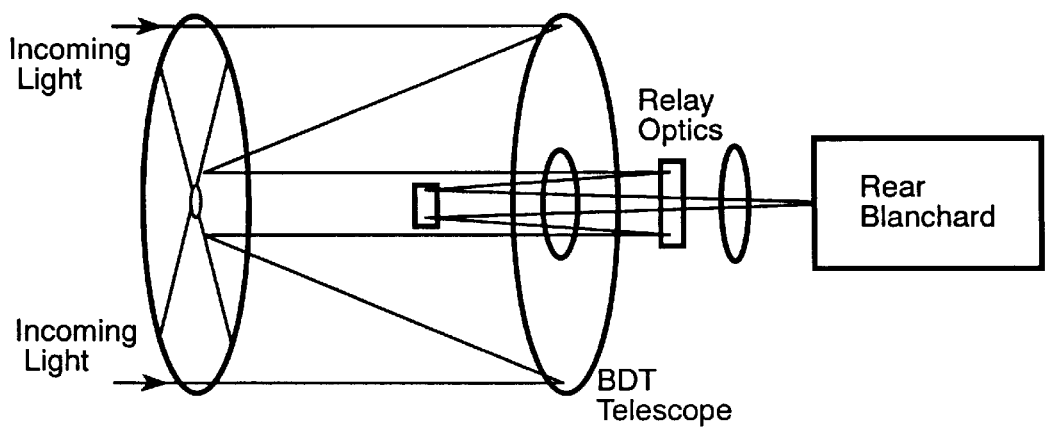
FIG. 1 shows a typical hardware setup for phase diversity measurements known in the prior art.
Figure 1:
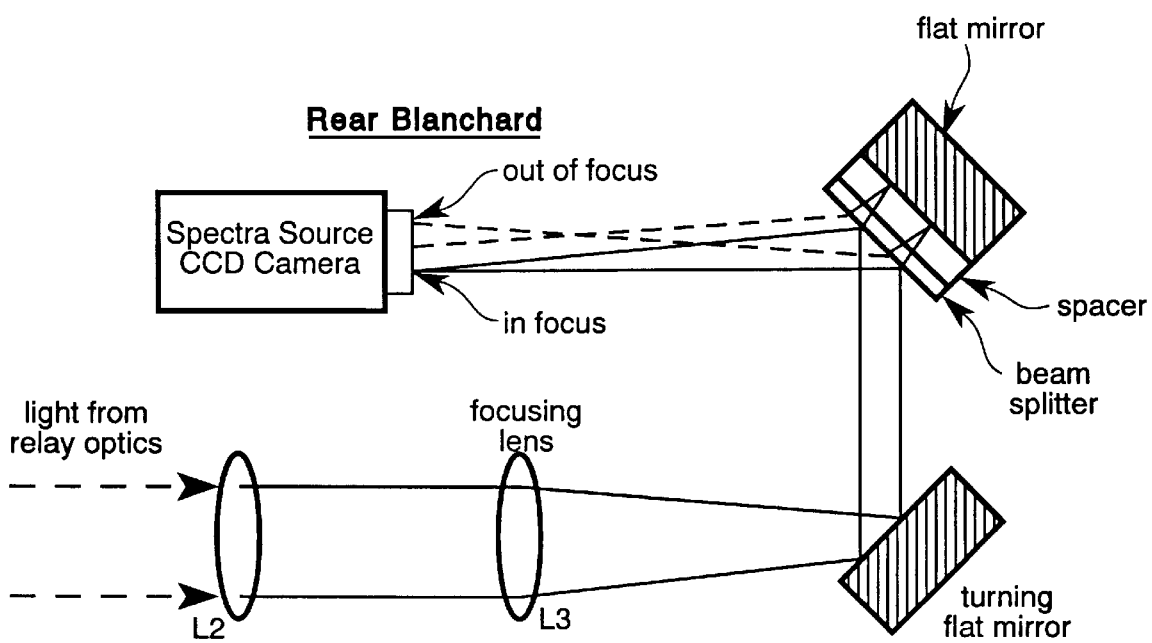

Wavefront sensors using phase diversity employ both hardware and software. An example of a phase diversity wavefront sensor known in the prior art is shown in FIG. 1 (R. A. Carreras et al., Optics Communications, 130 (1996), p. 16). The optical beam is produced by the 81-cm Beam Director Telescope (BDT) located at Maui. Details of the rear blanchard containing the phase diversity hardware show a beamsplitter, spacer, and mirror configuration used to produce in focus and out of focus images for the camera. Both images are presented simultaneously to the same CCD camera so that the identical system aberrations are on each image. The difference between the two images is then due only to the defocus in the diversity image. The first surface reflection gives rise to the in-focus image. The flat mirror reflection gives the out of focus image. The spacer causes a path length difference of 0.8 mm corresponding to 1 wave of defocus. A phase diversity algorithm was applied to each frame of data to correct the optical system aberrations. The wavefront sensor of the present invention estimates the wavefront aberrations in near "real time." Corrections to the optical beam can then be made online by introducing the opposite phase shift into the elements of the LC SLM.

Figure 2:
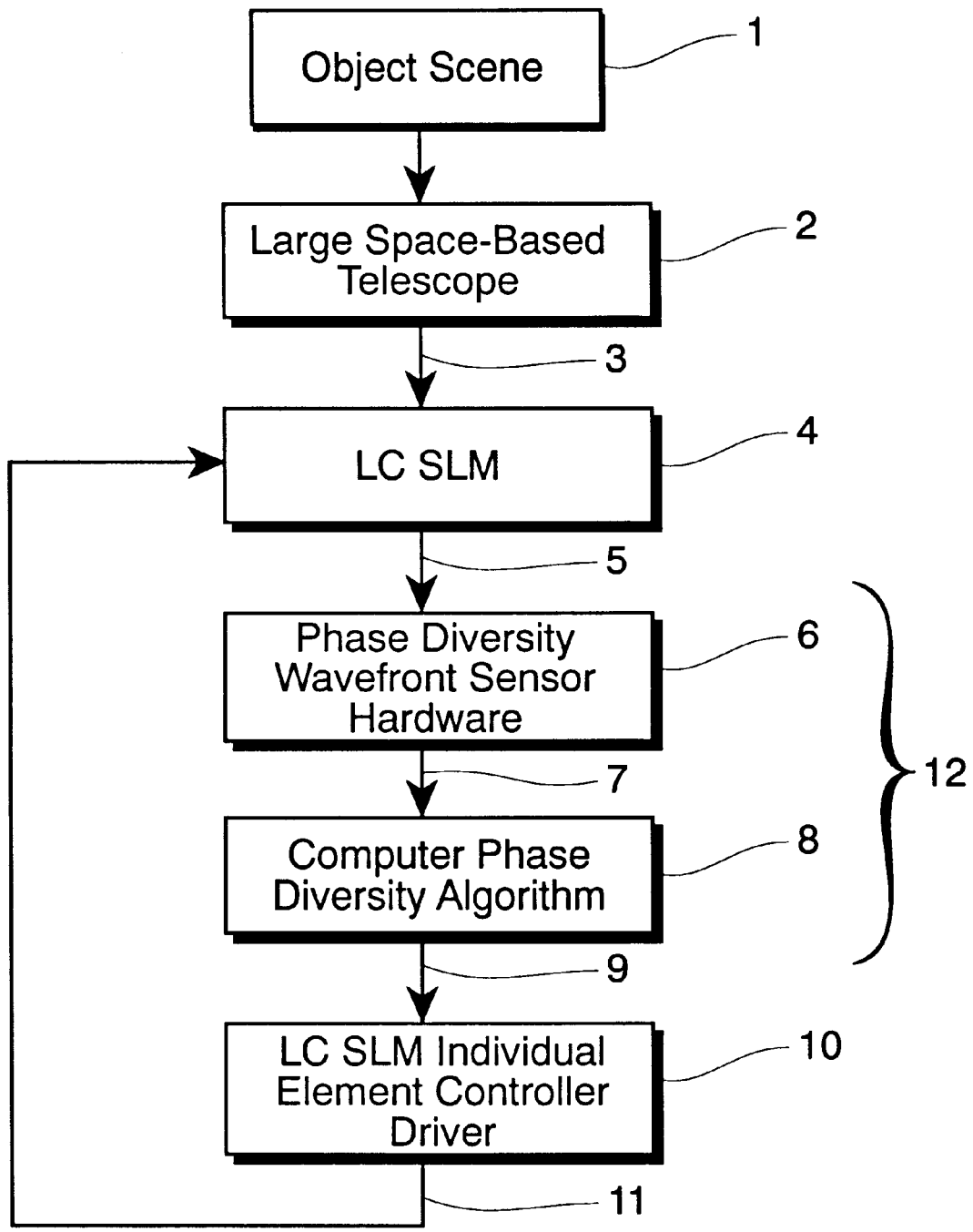
FIG. 2 is a block diagram of a closed-loop implementation using phase diversity hardware and a LC SLM on a large optical system.
Figure 3:
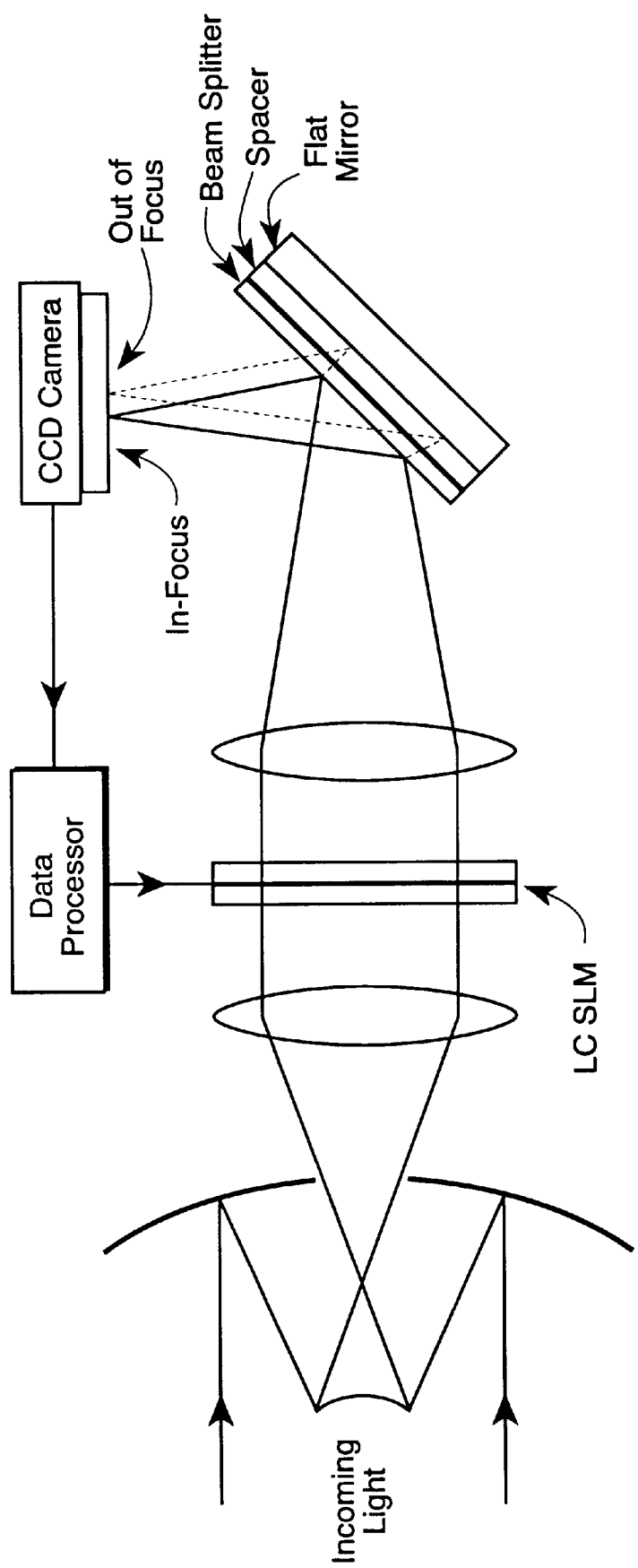
FIG. 3 is a schematic presentation of the preferred embodiment of the invention.

A diagram of the preferred embodiment of the present invention is shown in FIG. 2 and a schematic diagram shown in FIG. 3. An object scene 1 is imaged by a large space-based telescope 2. The telescope produces an optical beam 3 with various phase aberrations produced by the imaging system. A liquid crystal spatial light modular 4 (LC SLM), consisting of a two-dimensional array of liquid crystal variable retarders, is located in the optical beam between the telescope 2 and the hardware part 6 of the phase diversity wavefront sensor 12. The optical beam passes through the LC SLM to the wavefront sensor hardware 6.

For a phase diversity sensor, two images are produced. One image is the usual best focus image of the object scene degraded by the optical system aberrations. Inducing an additional known aberration onto the same focal plane (diverse image) forms the second image. Defocus was the induced aberration in FIG. 1, where the difference in path length caused by the spacer was 0.8 mm. This corresponded to 1 wave of defocus.

The electronic signals representing these images 7 are sent to a computer 8 that estimates the wavefront phase aberrations of the optical beam 5 based on a phase diversity algorithm. The computer 8 outputs this information 9 to the LC SLM controller driver 10. The controller driver sends signals to 11 induce the opposite phase into each element of the LC SLM, thereby correcting the optical beam 3 for real-time aberration control.

A Meadowlark Optics two-dimensional spatial light modulator (HEX-127P-λ) was used for laboratory tests of this system. It consists of a two-dimensional array of liquid crystal variable retarders that act as a real-time programmable phase mask for wavefront correction. Since the nematic liquid crystals in these modulators are polarization sensitive, the preferred LC SLM 4 device uses two sheets of liquid crystal which are oriented at 90 degrees to each other and sandwiched together.

We claim:

1. In a large space-based optical system producing an optical beam representing an object scene, an adaptive optical system comprising:

a. an optical system producing an optical beam representative of an object scene;

b. a liquid crystal spatial light modulator with individual controllable elements through which said optical beam passes and capable of effecting phase aberration corrections to the optical beam;

c. a wavefront sensor means for estimating the optical beam wavefront phase aberrations to be sent to the liquid crystal spatial light modulator and outputting electronic signals indicative of said wavefront aberrations; and d. a liquid crystal spatial light modulator controller driver means to receive said electronic signals and to thereby control the individual elements of said liquid crystal spatial light modulator to correct the estimated wavefront aberrations in a closed-loop system.

2. The system of claim 1 wherein said wavefront sensor means is comprised of a phase diversity wavefront sensor.

3. The system of claim 1 wherein the liquid crystal spatial light modulator consists of two sheets of liquid crystal which are oriented at 90 degrees to each other and sandwiched together.

* * * * *